Figure 1:
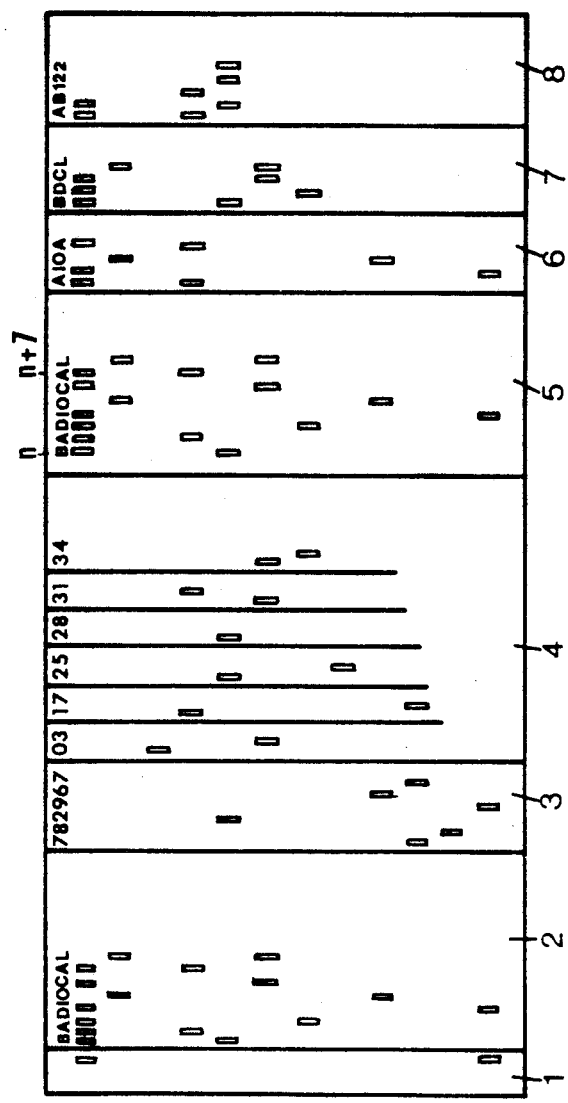

United States Patent [19]

Gevers

[11] 4,362,929

[45] Dec. 7, 1982

[54] METHOD OF PREPARING INDEXES

[76] Inventor: Vincent M. Gevers, 96, Wouwstraat, Hove-Antwerp, Belgium

[21] Appl. No.: 253,864

[22] Filed: May 16, 1972

Related U.S. Application Data

[63] Continuation of Ser. No. 46,657, Jun. 16, 1970.

[51] Int. Cl.³ .............................................. G06F 7/12
[52] U.S. Cl. .................................................. 235/432
[58] Field of Search ...................... 235/61.6 R, 61.7 R, 235/61.9 R, 61.12 R, 61.12 N, 61.12 M; 283/17; 35/2-4, 71; 179/1 SA

[56] References Cited

U.S. PATENT DOCUMENTS

| | | | |
|---|---|---|---|
| 3,023,399 | 2/1962 | Dickinson | 340/149 |
| 3,072,328 | 1/1963 | Bewley et al. | 235/61.1 |
| 3,277,445 | 10/1966 | Diamant et al. | 235/61.9 R |
| 3,312,944 | 4/1967 | Kull et al. | 340/172.5 |

OTHER PUBLICATIONS

Phyfe, "How Should I Pronounce," 1885, pp. 122-137.

Primary Examiner—Thomas J. Sloyan
Attorney, Agent, or Firm—Stevens, Davis, Miller & Mosher

[57] ABSTRACT

A method of recording data, such as trade marks, for searching by data processing means comprising recording the data on data processing supports first as it normally appears and again according to an alphabet code, phonic code or cryptographic code, filing the data processing supports in a logical order by the alphabet code and preparing lists of the data.

4 Claims, 5 Drawing Figures

METHOD OF PREPARING INDEXES

This is a continuation of application Ser. No. 46,657, filed June 16, 1970.

The invention relates to a method for preparing at least one list of word marks which may be any type of combination of letters and sometimes digits for similarity and prior registration searches.

The term "work mark" as meant within the context hereof covers, as well as a trade mark in accordance with the strict legal definition of the term, any verbal indication about a product or an industrial or commercial undertaking or a shop name or a sign. The term "work mark" can therefore extend inter alia to a main verbal element of a trade mark.

There are many factors which can be considered in determining similarity between various trade marks such as, for instance, identical prefixes, identical suffixes, identical sequence of the first vowels, identical sequence of the first consonants, phonetic similarities and sharing the same root.

Various kinds of indexes are known wherein work marks are arranged in various logical orders corresponding to various similarity factors. For instance, there are alphabetic indexes, and there are indexes in which the marks are filed on the basis of their suffix or vowel or consonant sequence. There are other indexes, known as cross reference or "cut" indexes, in which the marks are "cut" at one or more places and filed alphabetically in accordance with each such "cut". For instance, a mark BADIOCAL can be cut under ADIOCAL and DIOCAL, and filed alphabetically at three places—i.e., under BADIOCAL, ADIOCAL and DIOCAL, respectively.

Some indexes or lists take the form of card indexes. A disadvantage of this form of index is the considerable space required; also, cards may get lost or be accidentally misplaced, while errors and omissions in a card index are difficult to discover and check.

Other indexes take the form of lists in which the marks are recorded one below another. Lists of this kind have some advantages over card indexes; they take up less space than the latter and there is less risk of items being lost or misplaced. But, just like card indexes, errors and omissions are difficult to discover and check.

Lists of marks are satisfactory in these cases where the marks are recorded one below another in chronological order of publication. There are indexes consisting of lists of marks having a given vowel sequence. For instance, all marks having the vowel sequence A I O are recorded in one list in chronological order of publication. Any freshly published mark is recorded at the end of the existing lists after the marks already recorded. However, lists are less satisfactory in these cases where the new marks cannot be recorded at the end of the list, as is the case, for instance, with alphabetical indexes where new entries must be made not at the end of the list but at a place depending upon alphabetical order.

There are also punched card indexes which can be searched through with the aid of sorting machines. This kind of index also has a number of disadvantages. Cards may get lost or be accidentally misplaced; they may tear as they pass through the sorting machine, in which event they must be remade, with possible further errors and omissions. The operator may make a mistake in controlling the sorting machine and thus cause mistakes in searching.

Mark indexes in magnetic tape form have been suggested, but searching must then be done by a computer which is often too expensive.

One object of this invention is an index preparation method combining the advantages of the known lists and card indexes while obviating their disadvantages and giving facilities not previously available. Full and accurate indexes can be prepared and kept up to date regularly at reasonable cost by means of the method according to the invention.

This invention relates mainly to a process for making directories of word marks in which said word marks are classified according to a new systematic different from the mere alphabetical systematic.

According to the invention, each word mark is first recorded with its original spelling on a record, and then transcribed on the same record in a transcription zone according to a conventional alphabet i.e. a code.

Afterwards the records are classified in the alphabetical order of the transcription and eventually the marks are listed in their original spelling and classified according to the alphabetical order of the transcription.

In one embodiment of the invention, the marks are recorded on data processing supports, the same are then classified by data processing means in a logical order, and the index of the marks thus arranged is prepared by data processing means from the classified supports. In the present context the term "data processing support" is used to denote any element adapted to retain information and restore it in written characters, such as a punched or carbon card, a "block" or portion of magnetic tape, a sector of a magnetic disc, a ferrite memory element or a solid state memory element.

In one embodiment of the invention, after a first marks index has been prepared, the following steps are repeated at least once—data processing classifying of the data processing supports in a different logical order, and the data processing preparation of a list of the marks from the reclassified supports, the logical order differing at each repetition. In another embodiment, those of the data processing supports which correspond to marks appearing at a number of places in the index are reproduced by data processing means in a number of copies corresponding to the number of insertions of the mark in the index. In a preferred embodiment of the invention, the word mark is transcribed into a conventional alphabet, is recorded by data processing means on at least some of the data processing supports in a filing zone, whereafter such supports are filed in a logical order of the conventional alphabet transcriptions and an index of the marks thus arranged is prepared by data processing means from the supports thus filed.

The term "conventional alphabet" as used in the present context denotes any representations of letters or groups thereof by letters or digits or other symbols.

The invention also relates to an index and to a set of indexes prepared by the method and to a data processing support and a set of supports used to perform the method.

The invention relates inter alia to a collection of punched cards which each have a mark recorded on them and which are numbered in a continuous sequence or series. The invention also relates independently of the method to a data processing support on which a mark and a conventional alphabetic transcription thereof are recorded.

Figure 2:
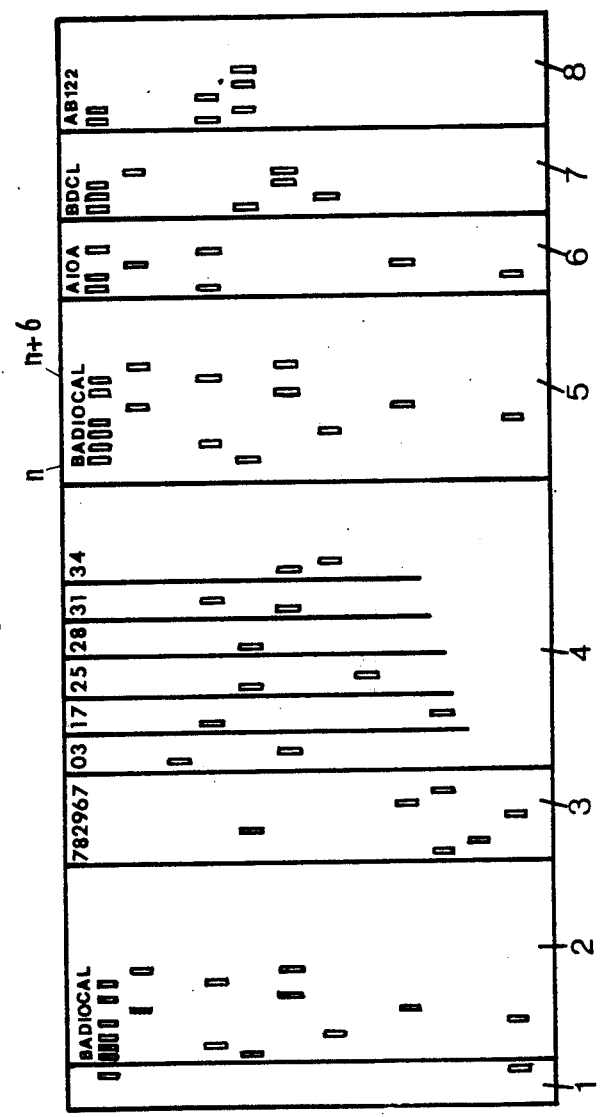
Figure 3:
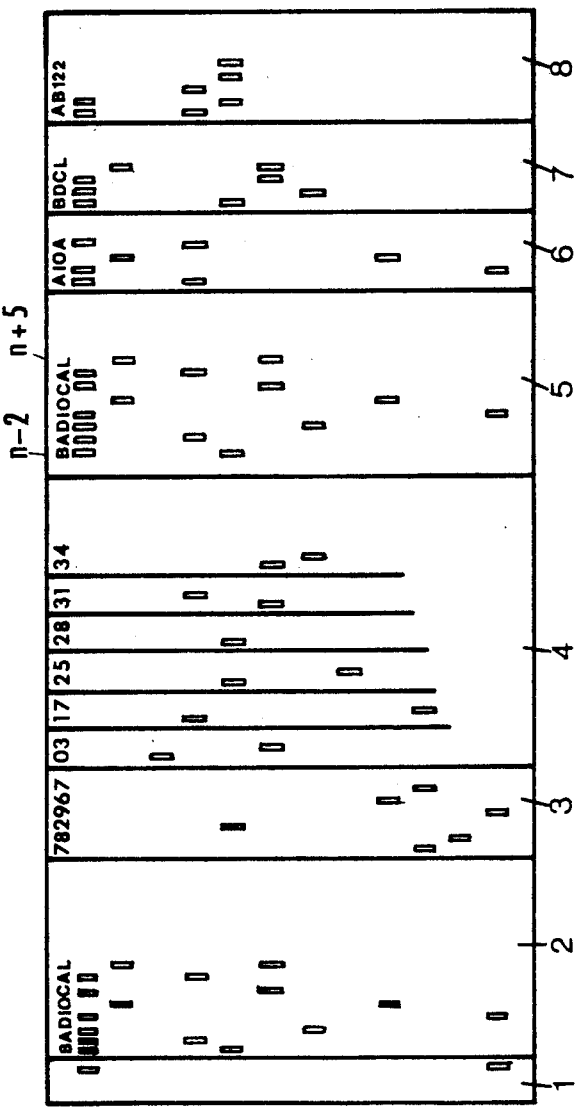
Figure 4:
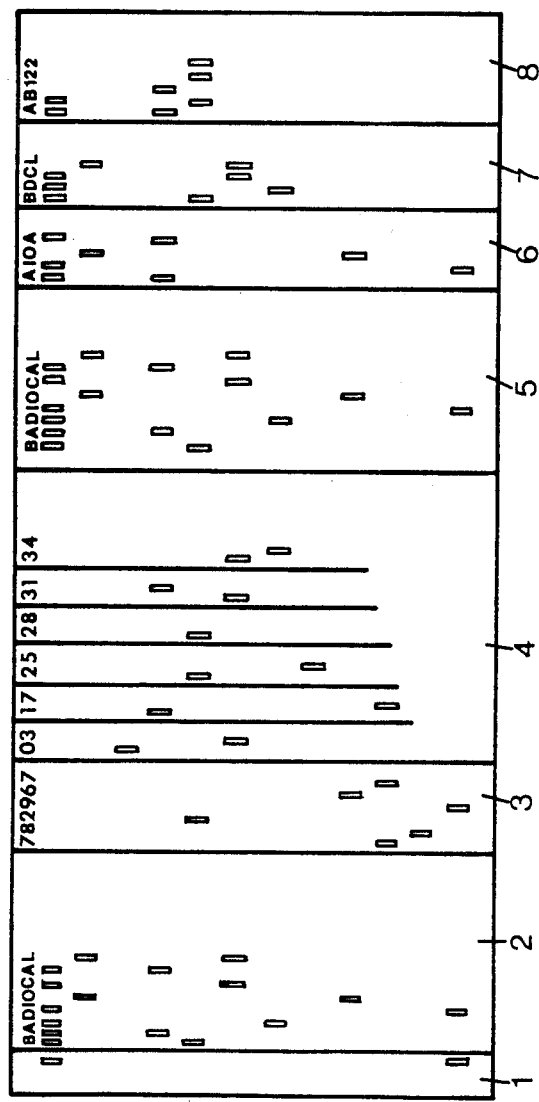
Figure 5:
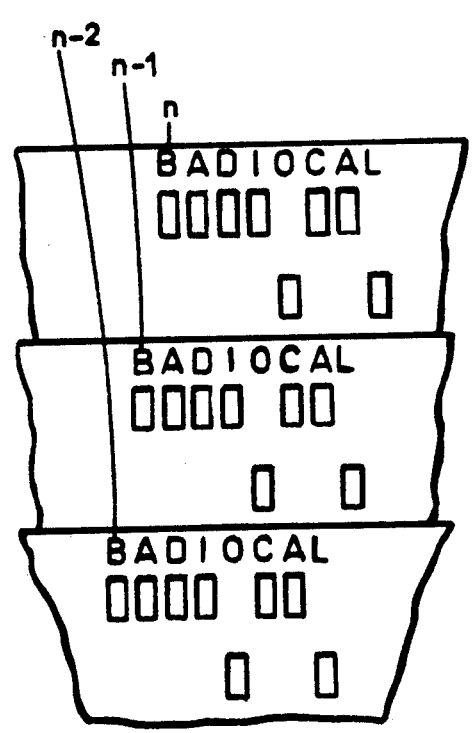

Other details and features of the invention will become apparent from the description of a method of preparing directories and indexes, of an index and of a set of indexes thus prepared, and of a data processing support and a collection of supports according to the invention, the description being given hereinafter by way of non-limitative example and with reference to the accompanying drawings wherein:

FIGS. 1 to 4 show punched cards forming one embodiment of data processing supports used to carry the method according to the invention into effect, and FIG. 5 is a view to an enlarged scale of a portion of the cards shown in FIGS. 1-3.

Like references denote like elements throughout the drawings.

FIG. 1 shows a punched card prepared for a mark BADIOCAL assumed to be filed at the International Bureau under the No. 782,967 in classes 03, 17, 25, 28, 31 and 34 of the International Classification of Products. The card is divided into 8 zones having references 1 to 8. Zone 1 is punched with a letter or digit indicating the country of registration. In this particular case, the letter I is punched to show that the mark is an international mark. The mark-in this case BADIOCAL-is punched in the zone 2. The mark number-in this case 782,967-is punched in zone 3. The classes of goods for which the mark is filed are punched in zone 4-i.e., 03, 17, 25, 28, 31 and 34 in this particular case. The mark-i.e., BADIOCAL in this case-is repeated in zone 5 which is called the "filing zone". The sequence of the first vowels-i.e., A I O A-is punched in zone 6. The sequence of the first consonants-i.e., B D C L-is punched in zone 7. The data punched in zones 1 to 4 are to appear in the index. The data punched in the zones 5-7 are for filing purposes. The data in zones 5, 6, 7 can be punched automatically by known data processing machines, for example a computer, from the punches in zone 2.

A card of the kind shown in FIG. 1 is prepared for each word mark required to appear in the index and, where applicable, for each main verbal element of a word. For instance, in the case of the mark "White Horse" a first card can be prepared on the basis of the element "Horse" as the main element and a second card can be prepared on the basis of "White" as the main element. Cards referring to a given period of time, for instance cards of marks published in a single year, are classified in chronological order of mark publication, then numbered in a continuous series in zone 8.

Three examples of how indexes can be prepared according to the invention will be given hereinafter.

EXAMPLE 1

This example is for indexes in which only one card per mark is required.

Once punched cards of the kind shown in FIG. 1 have been prepared as described, all the cards are classified by a sorting machine in a logical order, an index of marks is prepared by a data processing printing machine in said logical order. These steps can be carried out several times with the same cards classified in different logical orders in order to obtain several indexes of marks classified in said different logical orders. Each index includes the data of zones 1-4-i.e., the country in which the marks are registered, the marks themselves, their number and the classes of goods. The data in zones 5-7 of the cards is not used for the indexes.

Sorting and printing machinery is well-known in the art and will not therefore be described here.

The various indexes thus prepared differ from one another only in the order in which the marks are arranged. The following indexes are therefore obtained:

(a) Alphabetical, by filing the marks alphabetically on the basis of the perforations in zone 5;

(b) Vowel alphabetical, by filing the mark in accordance with the perforations in zone 6;

(c) Consonant alphabetical, by filing the marks in accordance with the perforations in zone 7.

If required, the punched cards can be filed in a more complicated order. For instance, there can be a "major" filing of the punched cards on the basis of vowel sequence-i.e., on the basis of the perforations of zone 6-and a "minor" filing by consonant sequence-in accordance with the perforations in zone 7. In other words, different marks having the same vowel sequence are classified by consonant sequence.

After the indexes have been prepared, a sequence check is made on the basis of the perforations in zone 8, by a procedure which is well-known in data processing duplication and which will therefore not be described here. This step gives a check that the index of punched cards is still complete when it has been used as previously described.

EXAMPLE 2

This example relates to indexes in which some marks must appear several times, each time at a different place. This occurs, for instance, in "cut" indexes where some marks are "cut" and filed in one or more places.

FIGS. 1 to 3 show the case of a mark BADIOCAL which is required to be filed at three different places in the index-i.e., at the alphabetical places BADIOCAL, ADIOCAL, DIOCAL. In the card shown in FIG. 1, the mark BADIOCAL is punched in zone 5 from column n, whereas in the cards shown in FIGS. 2 and 3 the mark is punched in zone 5, from columns n-1 and n-2, respectively. If the complete index of punched cards is filed alphabetically in accordance with the perforations of the column n and of the following columns, but neglecting the previous columns, the cards shown in FIGS. 1, 2 and 3 will be respectively positioned at the alphabetical places BADIOCAL, ADIOCAL, DIOCAL.

The example is shown more clearly in FIG. 5 which is a view to an enlarged scale of the top part of the zones 5 of the card shown in FIGS. 1-3.

EXAMPLE 3

The punched card according to FIG. 4 is prepared for a mark CYBBELIN assumed to have been filed at the international trade mark bureau under the number 925,036 in classes 03, 17, 25, 28, 31 and 34 of the international classification of products.

The card is divided into 8 zones having references 1 to 8. Zone 1 is punched with a letter or digit indicating the country of registration. In this particular case, the letter I is punched to show that the mark is an international mark. The mark-in this case CYBBELIN-is punched in the zone 2. The mark number-in this case 925,036-is punched in zone 3. The classes of goods for which the mark is filed are punched in zone 4-i.e., 03, 17, 25, 28, 31 and 34 in this particular case.

Zone 5 is the "filing zone". In this zone the mark-in this case CYBBELIN-is transcribed according to an alphabet code. Such code comprises the following rules:

C followed by E, I or Y equals S;

Y equals I;
a double letter equals a single letter.
A more extended code may also be used such as:
(1) a double letter equals a single letter;
(2) C equals K except:
CE equals SE
CI equals SI
CY equals SI
CH equals CH;
(3) PH equals F;
(4) Q equals K;
(5) Y equals I;
(6) Z equals S;
(7) KS, CS and QS equal X;
(8) H is ignored except in CH and SH;
(9) U is ignored after Q;
(10) CH and SH are replaced by Z.

According to these rules CYBBELIN of zone 2 is transcribed in zone 5 in SIBELIN.

Hence, the mark is punched in its real spelling in zone 2, and an alphabet code translation of the mark is punched in the filing zone 5. These transcriptions and translations are performed automatically by means familiar in data processing which may or may not include the use of computers.

The sequence of the vowels of the transcribed mark of zone 5-i.e., I E I-is punched in zone 6.

The sequence of the consonants of the transcribed mark of zone 5-i.e., S B L N-is punched in zone 7.

The data punched in zones 1 to 4 are to appear in the index. The data punched in the zones 5-7 are for filing purposes. The data in zones 5, 6, 7 can be punched automatically by known data processing machines, for example a computer, from the punches in zone 2.

Zone 8 is reserved for other purposes.

A card of the kind shown in the figure is prepared for each word mark required to appear in the index and, where applicable, for each main verbal element of a word. For instance, in the case of the mark "White Horse" a first card may be prepared on the basis of the element "Horse" as the main element and a second card may be prepared on the basis of "White" as the main element.

Once punched cards of the kind shown in the figure have been prepared as described, all the cards are classified by a sorting machine according to the transcriptions of filing zone 5.

The mark CYBBELIN is filed as if it were spelled SIBELIN. If any such mark SIBELIN exists, the CYBBELIN mark will be adjacent the differently spelled but identically pronounced SIBELIN mark in the indexes.

Marks such as SCIBELLIN, ZIBBELIN et cetera, if they exist, will also be classified under SIBELIN, and be adjacent to SIBELIN, CYBBELIN et cetera.

In all the examples hereinbefore described, the perforations in the zones 5-7 can be punched automatically from the perforations in the zone 2 by means of computers. Since the data in zones 1-4 are the only data to be reproduced in the indexes, the marks will always appear correctly spelled in whatever order, including phonetic order, they may have been filed and in however many places they may be inserted.

As a variant, the index pages are numbered automatically in the data processing printing machine as they are prepared. Also, a summary card giving the page number and the prefix of the first mark on the page is prepared for each page of the list by means familiar in data processing. For instance, if the first mark on page 193 is BADIOCAL, filed at the place corresponding to DIOCAL, the summary card corresponding to this page has perforations relating to the prefix of the filing-i.e., DIOC-and to the page number-i.e., 193. These summary cards can be used in a printing machine to prepare a list of contents of the index.

According to another feature of the invention, the indexes, instead of being prepared on ordinary paper, can be prepared on printing plates, for instance, offset plates, in which event many copies of the indexes can be prepared.

The index can be kept up to date by punching the cards for each new mark entry and by using the cards to prepare a temporary card index for searches of marks not appearing in the lists. The temporary card index can be formed either by the punched cards or by cards which the printing machine prepares automatically from the punched cards.

When the card index is considered to have grown too bulky, the index is completely recast. To this end, the cards used to prepare the index are taken, cards referring to ceased marks are automatically removed, for instance by a sorting machine, and cards for new marks not appearing in the indexed are added. From this recast index of punched cards, fresh indexes are prepared as hereinbefore described, and the old indexes are discarded.

The advantages and uses of the method and of the indexes according to the invention are legion. For instance, indexes prepared by the method hereinbefore described differ from conventional indexes more particularly in their outstanding regularity. Provided that the punched cards have been correctly prepared and carefully checked, all indexes prepared from the cards are completely free of errors and omissions, such as errors in spelling the marks, in mark registration number and in goods classes; also they are free from filing errors, however complex the logical order in which the marks are arranged may be.

The cost of preparing a set of indexes by the method according to the invention can be broken down between two main items, namely:

A. A fixed first-cost item covering preparation and checking of the punched cards, and B. An item proportional to the number of indexes to be prepared.

The cost of preparing a set of indexes (excluding the first costs under A) is substantially proportional to the time taken for preparation, comprising machine hire cost and labor costs for the machine operators. Since some kinds of sorting machines can sort more than 100,000 cards an hour and some printing machines can reproduce the text of more than 9,000 cards in an hour, the indexes can be prepared rapidly and the cost of preparing them is therefore reasonable, disregarding the first costs set out in A. The cost of preparing indexes is low enough for the number of differently organized indexes to be multiplied and for the indexes to be frequently recast at reasonable cost.

Relatively little space is taken up by a complex set of documentation. A set prepared for 500,000 marks, comprising 10 indexes in each of which the 500,000 marks are filed in a different logical order, comprises, on the basis of 140 marks per sheet (500,000×10)/140 = approximately 35,000 sheets. If the indexes are prepared by printing machine on a printing plate, for instance, an offset plate, a large number of copies can be reproduced at low cost and distributed to different places. For instance, as applied to international marks, the invention can readily produce enough copies of the index for one or more copies to be distributed to each country belonging to the Madrid Convention. Similarly, an index or set of indexes for marks registered in all the Common Market countries can be organized and copies distributed to the various countries concerned. Similar considerations apply to all the countries of the American continent.

The method according to the invention and the indexes prepared in accordance with the invention can provide new kinds of facilities. For instance, if a trade marks consultant wants to know prior registrations in respect of a mark CYBBELIN, he can be supplied with the list of marks having the prefix CYB (or the prefix SIB in the conventional alphabet), with the list of marks having the suffix ELIN, with the list of marks in which the vowel sequence I E I appears in the conventional alphabet, with the list of marks in which the consonant sequence S B L N appears in the conventional alphabet, and with the list of marks comprising the radicals SIBEL, IBELI, BELIN. All that as to be done is to sample the corresponding sheet of the stock printed from the offset plates. Once he has these documents, the consultant can do the searching and select those of the marks on the sheets which he considers relevant.

Alternatively, anyone who wants to create a new mark from a desired radical, such as FLOR, can ask for a copy of those sheets of the indexes when marks comprising the FLOR radical are grouped. He can then readily devise a mark which is sufficiently different from previously filed marks which include the radical FLOR.

The invention is not, of course, limited to the embodiments hereinbefore described and can be modified in many ways, inter alia as regards the form, number, composition and arrangement. For instance, the division of the punched cards into zones can be other than shown by way of example in the drawings; for instance, one zone reserved for mark suffixes can be provided, and other zones reserved for other indications, such as the page and the year of official gazette where the mark was published in extenso, can be provided.

The punched cards hereinbefore described are given merely as examples of data processing support of use for the invention and can be replaced, without departure from the scope thereof, by any other data processing support-i.e., by any element and more particularly any surface suitable for the recording of indicia readable by machines. Like a perforated card, therefore, a segment of electromagnetic tape is data processing support, et sim a carbon card. The term "by data processing means" refers to any data processing means in the widest sense and therefore including devices such as sorting machines, printing machines, computers and so on which can file, check and reproduce the elements recorded on the supports, inter alia punched cards or magnetic tapes. Magnetic tapes can therefore be used instead of punched cards and a mixed card and a magnetic tape system is also possible. For instance, the method hereinbefore described of preparing a "cut" index can be replaced by the following method.

Punched cards prepared as described with reference to FIG. 1 are filed in alphabetical order, and the marks thus filed are recorded on magnetic tapes called "auxiliary tapes". The punched cards are then refiled from the second letter of the mark-i.e., neglecting the first letter-and the marks thus filed are recorded on a second auxiliary tape. The operation is repeated several times, the second, third and so on first letters of the mark being neglected "consecutively", an auxiliary magnetic tape being prepared at each operation. The auxiliary tapes are then reproduced on a main tape, and the marks recorded on the various auxiliary tapes are filed together with one another through the agency of computers by a procedure familiar in data processing. This leads to a tape in which the marks are filed alphabetically and by cuts. The indexes are prepared from this letter tape.

The procedure described can be used to prepare indexes in which the marks are filed in logical orders other than those described in the examples hereinbefore given. For instance, indexes can be prepared in which the marks are classified alphabetically but reading from right to left, or on a "major" basis by the suffix and on a "minor" basis alphabetically, or on a "major" basis for the first two letters and on a "minor" basis for the last two letters, and so on. Indexes of all the marks registered in a country or group of countries can be prepared, as can indexes limited to the marks of a particular class of goods or to a group of classes of goods, and so on.

I claim:
1. A machine process for making directories of word marks, comprising the steps of:
  (a) recording each word mark on a data processing support in the form of a first series of machine readable indicia;
  (b) feeding the thus obtained supports into a machine programmed to add to said first series of indicia a second series of machine readable indicia, each of said first and second series of machine readable indicia representing alphabetic characters, said second series of machine readable indicia corresponding to the word marks as transformed according to a predetermined objective alphabetic translation code which is applied to the letters of said word marks in a manner such that there is only one possible transformation permissible from the indicia of said first series to the indicia of said second series and a plurality of different first series indicia can be transformed to the same second series indicia, said alphabetic translation code applying at least the following rules to the letters of said word mark as represented by said first series of indicia:
    (1) a double letter equals a single letter;
    (2) CY equals SI;
    (3) Y equals I;
  (c) recording said second series of indicia on said supports;
  (d) feeding the thus completed supports into a sorting machine programmed to classify the supports according to the indicia of the second series; and
  (e) printing by means of the thus classified supports the word marks corresponding to the indicia of the first series.
2. A machine process for making directories of alphanumeric data comprising the steps of:
  (a) recording each datum on a data processing support in the form of a first series of machine readable indicia;
  (b) recording on each of said data processing supports a second series of machine readable indicia, each of said first and second series of machine readable indicia representing alphabetic characters, the indi- cia of said second series being related to the indicia of said first series recorded on the same support according to a predetermined objective alphabetic translation code which is applied to the letters of said alphanumeric datum in a manner such that there is only one possible transformation permissible from the indicia of said first series to the indicia of said second series and a plurality of different first series indicia can be transformed to the same second series indicia, said alphabetic translation code applying at least the following rules to the letters of said alphanumeric datum as represented by said first series of indicia:
  (1) a double letter equals a single letter;
  (2) CY equals SI;
  (3) Y equals I;
(c) feeding the thus completed supports into a sorting machine programmed to classify the supports according to the indicia of the second series; and
(d) printing by means of the thus classified supports the data corresponding to the indicia of the first series.

3. A machine process for making directories of word marks, comprising the steps of:
  (a) recording each word mark on a data processing support in the form of a first series of machine readable indicia;
  (b) feeding the thus obtained supports into a machine programmed to add to said first series of indicia a second series of machine readable indicia and corresponding to the word marks according to a predetermined objective alphabetic translation code which applies the following translation rules to the letters of said word mark:
    (1) a double letter equals a single letter;
    (2) C equals K except:
      CE equals SE
      CI equals SI
      CY equals SI
      CH equals CH
    (3) PH equals F;
    (4) Q equals K;
    (5) Y equals I;
    (6) Z equals S;
    (7) KS, CS and QS equal X;
    (8) H is ignored except in CH and SH;
    (9) U is ignored after Q;
    (10) CH and SH are replaced by Z;
  (c) recording said second series of indicia on said supports;
  (d) feeding the thus completed supports into a sorting machine programmed to classify the supports according to the indicia of the second series; and
  (e) printing by means of the thus classified supports the word marks corresponding to the indicia of the first series.

4. A machine process for making directories of alphanumeric data comprising the steps of:
  (a) recording each alphanumeric datum on a data processing support in the form of a first series of machine readable indicia;
  (b) recording on each of said data processing supports a second series of machine readable indicia, the indicia of said second series being related to the indicia of the first series recorded on the same support according to a predetermined objective alphabetic translation code which applies the following translation rules to the letters of said alphanumeric datum:
    (1) a double letter equals a single letter;
    (2) C equals K except:
      CE equals SE
      CI equals SI
      CY equals SI
      CH equals CH
    (3) PH equals F;
    (4) Q equals K;
    (5) Y equals I;
    (6) Z equals S;
    (7) KS, CS and QS equal X;
    (8) H is ignored except in CH and SH;
    (9) U is ignored after Q;
    (10) CH and SH are replaced by Z;
  (c) feeding the thus completed supports into a sorting machine programmed to classify the supports according to the indicia of the second series; and
  (d) printing by means of the thus classified supports the data corresponding to the indicia of the first series.

* * * * *